United States Patent [19]
Alexandres

[11] 4,045,720
[45] Aug. 30, 1977

[54] AUTOMATIC RESETTING TEMPERATURE CONTROLLED BATTERY CHANGING SYSTEM

[76] Inventor: Richard Bernard Alexandres, P.O. Box 1645, Mason City, Iowa 50401

[21] Appl. No.: 683,162

[22] Filed: May 4, 1976

[51] Int. Cl.² .............................................. H02J 7/04
[52] U.S. Cl. ........................................ 320/35; 320/2; 320/55; 337/13
[58] Field of Search ..................... 320/2, 9, 35, 36, 54, 320/55; 317/40; 337/13

[56] References Cited

U.S. PATENT DOCUMENTS

| | | | |
|---|---|---|---|
| 3,601,679 | 8/1971 | Braun | 320/35 |
| 3,928,792 | 12/1975 | Mullersman | 320/35 |
| 3,935,525 | 1/1976 | Elson et al. | 320/35 |

Primary Examiner—Robert J. Hickey
Attorney, Agent, or Firm—Burns, Doane, Swecker & Mathis

[57] ABSTRACT

An automatically resetting battery charging circuit in which the temperature of the battery is sensed by a temperature responsive switch to control the charging of the battery between a fast charging rate and a trickle charging rate. Two current paths are provided between a charging current source and one terminal of the battery. The temperature responsive switch is located in one current path (the main or fast charging path) in series with a normally closed relay contact. The relay coil which controls the actuation of the relay and the opening of the relay contact is in the second current path (the trickle charging path) connected across the temperature responsive switch and the relay contact. When the battery temperature exceeds a predetermined value, the temperature responsive switch opens causing charging current to flow through the relay coil. The relay is thus energized, opening the relay contact and keeping the main charging path open irrespective of battery temperature. Thereafter, a trickle current is delivered to the battery through the relay coil. The relay coil is deenergized and the charging circuit automatically reset for subsequent charging by disconnecting the battery or otherwise interrupting current flow through the relay coil.

8 Claims, 2 Drawing Figures

AUTOMATIC RESETTING TEMPERATURE CONTROLLED BATTERY CHANGING SYSTEM

BACKGROUND OF THE INVENTION

The present invention relates to battery chargers and in particular to a battery charging circuit in which the temperature of a battery is sensed to control the charging of the battery through parallel charging paths.

Rechargeable sealed batteries such as multiple cell nickel cadmium batteries are commonly used in small electrical applicances and devices as the main power supply. Such devices are typically run from the battery supply without connection to an external source of power until the need for recharging arises. Thereafter, the device is typically coupled to a source of charging current such as a rectifier powered by normal AC current available in the home until the battery is recharged.

The recharging of such batteries can proceed at a relatively slow pace without too much danger of damaging the battery. However, for many uses it is desirable to recharge the battery as rapidly as possible so that the battery powered device is available for use without for use without too long a wait.

Fast charging systems for nickel cadmium batteries typically employ a temperature sensitive element to control the charging time and/or rate. A well known characteristic of nickel cadmium batteries is that the battery temperature exhibits a sharp rise near the point at which the battery goes into overcharge when the battery is charged at a fast rate. This temperature rise, apparently caused by the onset of oxygen generation and its recombination reaction in the cell, can be monitored by sensing the cell case temperature and has been used in various ways to change the charging rate or completely disconnect the battery from the source of charging current. For example, in one such system described in U.S. Pat. No. 3,928,792 issued to Mullersman et al, a manually set, temperature actuated switch normally coupled to the battery terminates fast charging of the battery by disconnecting the battery from the charging current source. It is further suggested in the Mullersman et al patent that the battery may be placed on a trickle charge via a bypass resistor in parallel with the temperature actuated switch after the switch has been actuated. In order to reset the temperature actuated switch so that the battery can be charged after use, the trigger mechanism for energizing the device from the battery is linked to the temperature actuated switch to manually reset the switch when the appliance is used.

In another system illustrated in U.S. Pat. No. 3,601,679 issued to Braun et al, the battery temperature is sensed during charging, and a relay coil actuated by the temperature sensing element opens a set of relay contacts to disconnect the battery charger from the battery when the battery temperature exceeds a predetermined value. The relay contact is arranged such that it is held in the open position even after the battery temperature returns to a lower value so that the battery remains disconnected from the charger once the predetermined temperature has been exceeded. Various ways are suggested by Braun et al for returning the relay contact to its closed position for subsequent charging operations.

While the foregoing and other known systems provide for fast charging of rechargeable cells, it has been found desirable to provide a relatively simple, highly reliable temperature controlled battery charged circuit wherein a minimum of inexpensive circuit elements is employed to automatically terminate the rapid charge above a predetermined battery temperature and to continue a trickle charge upon termination of the rapid charge, with the automatic reset of the circuit for subsequent charging upon interruption of all charging current to the battery.

It is accordingly an object of the present invention to provide a novel battery charging system having the aforesaid desirable characteristics.

It is another object of the present invention to provide a highly reliable, extremely simple and inexpensive battery charger employing an automatically resetable (i.e., normally closed) temperature responsive switch for changing the charging rate of a battery from a fast to a trickle rate upon the battery temperature exceeding a predetermined value wherein the current path for the fast charge remains open as long as a trickle charge is being supplied to the battery.

It is a more specific object of the present invention to provide a normal battery charger in which two parallel connected current paths, one containing a temperature responsive switch and a relay contact, and the other containing the coil for actuating the relay contact, supply fast charging currentand trickle charging current to a battery in response to battery temperature wherein supply of current through the two paths is essentially mutually exclusive and the circuit is automatically reset for subsequent charging when all charging current in interrupted by disconnection of the battery from the charger or the like.

These and other objects and advantages of the present invention will become apparent to one skilled in the art to which the invention pertains from the following detailed description when read in conjunction with the appended drawings.

DETAILED DESCRIPTION

Figure 1:
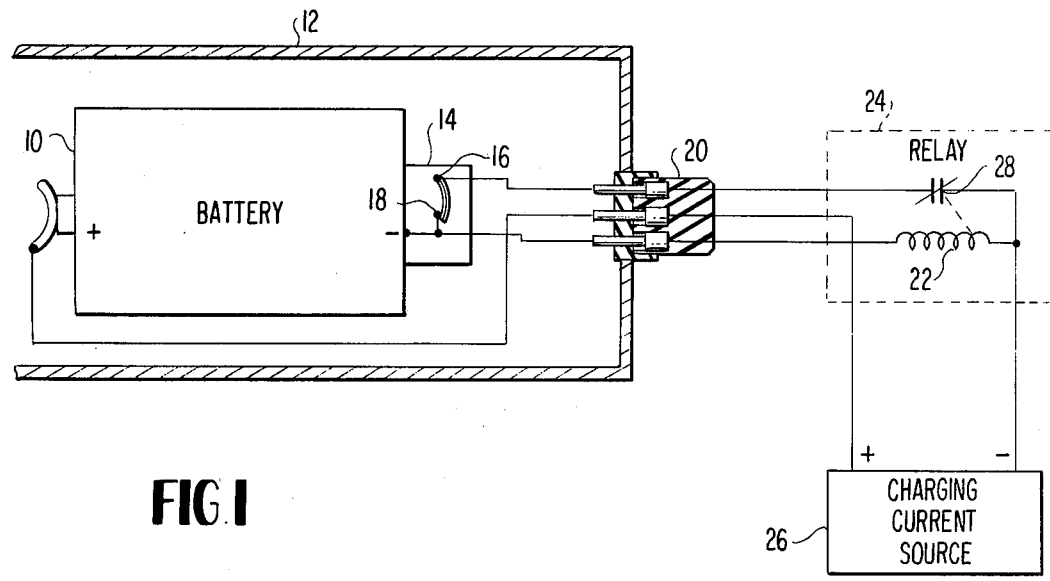
FIG. 1 is a diagrammatic representation of a battery charging system in accordance with the present invention.
Figure 2:
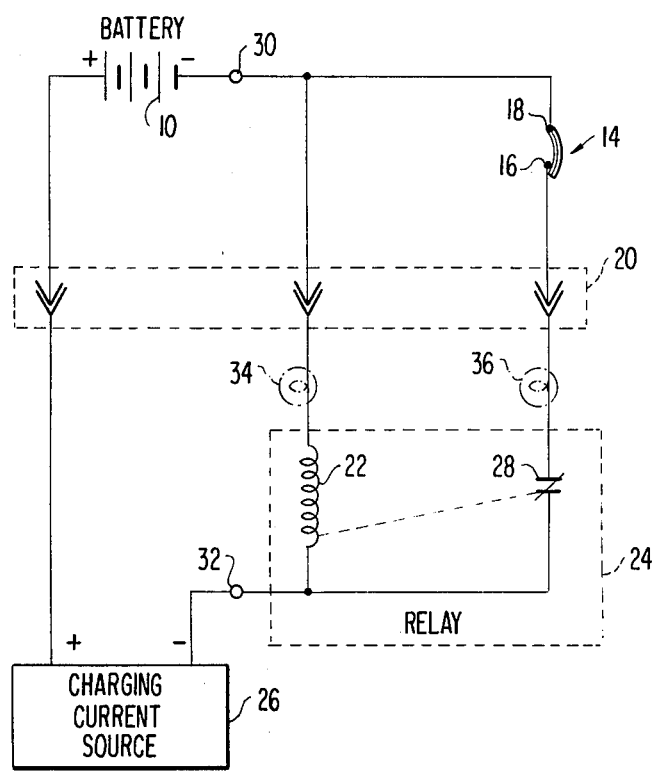
FIG. 2 is a schematic circuit diagram illustrating the battery charging system of the present invention.

FIG. 1 illustrates the battery charging circuit according to the present invention as it may be employed to charge nickel cadmium batteries in a cordless, battery powered tool or appliance. FIG. 2 schematically illustrates the circuit arrangement according to the present invention to facilitate an understanding of its operation.

Referring now to FIG. 1, a nickel cadmium battery 10 may be provided in a battery powered tool or appliance 12 (only partially shown) to power the tool during ordinary use. The battery may be housed and connections made thereto in any suitable conventional manner. A suitable conventional temperature responsive switch 14 is positioned in proximity to the battery 10 as shown or in any suitable manner providing thermal coupling between the battery 10 and the temperature responsive switch 14. The switch 14 is a normally closed switch in the sense that electrical continuity is provided between terminal 16 and 18 thereof below a predetermined temperature. When the predetermined temperature is exceeded, the switch assumes an open position and the electrical continuity or current path between the contacts 16 and 18 is interrupted.

One of the contacts of the switch 14 (e.g., the contact 18) is connected to one output terminal or electrode of the battery 10 and through a suitable plug or connector 20 and a coil 22 to one output terminal of a suitable charging current source 26. In the illustrated embodiment, the terminal 18 of the temperature responsive switch 14 is connected to the negative side of the battery 10 and therefore the terminal 18 is also connected through the relay coil 22 to the negative output terminal of the charging current source 26. However, it should be understood that the battery connections and charging current source connections may be reversed, e.g., so that the parallel current paths are connected to the positive sides of the battery and current source, without affecting the operation of the circuit.

The contact 16 of the temperature responsive switch 14 is connected through the plug or connector 20 and through a normally closed contact 28 of the relay 24 to the negative output terminal of the charging current source 26. The positive output terminal of the charging current source 26 is coupled through the connector 20 to the positive electrode of the battery 10 as illustrated.

The operation of the battery charging system according to the present invention may be more clearly understood with reference to FIGS. 1 and 2 wherein like numerical designations have been utilized to indicate like elements. Referring now to FIGS. 1 and 2, the temperature responsive switch 14 is thermally coupled to the battery 10 and therefore senses the temperature of the battery 10 and responds thereto. The switch 14 may be, for example, a conventional bimetallic strip (e.g., a thermostatic circuit breaker) which normally provides continuity for current flow between the contacts 16 and 18 until a predetermined temperature is exceeded. Thereafter, the switch 14 opens and remains open until the temperature returns to a value below the predetermined switching value. The resetting of the switch 14 to the normally closed position will occur automatically whenever the temperature drops below the predetermined value.

The series combination of switch 14 and relay contacts 28 provide one current path between first and second terminals 30 and 32 which are connected respectively to one side of the battery 10 and the side of the charging current source 26 of like polarity. The connection of the relay coil 22 between the terminals 30 and 32 provides a second current path between these terminals and, with the arrangement as illustrated, the first and second current paths are connected in parallel. The current flow from the charging current source 26 to the battery 10 will therefore split with the greater amount of current flowing through the path of least resistance.

The current path containing the switch 14 and the relay contact 28 is essentially a short circuit since the switch 14 and relay contact 28 have essentially zero resistance. The second current path containing the relay coil 22, however, has a finite resistance to current flow of a value substantially greater than the resistance of the other current path. More specifically, the relay coil 22 has a predetermined resistance to the flow of direct current, which resistance may be on the order of 10 to 100 or more ohms. At some predetermined value of current flow through the coil 22, the relay will be actuated opening the relay contacts 28. As will be appreciated, the circuit of the present invention operates such that the current flow through the relay 22 is insufficient to actuate the relay and open the contacts 28 during the fast charging of battery 10 (i.e., prior to the temperature at which the switch 14 opens). Accordingly, the DC resistance of the current path through the relay coil 22 is selected so that when the switch 14 and relay contact 28 are in their normally closed positions, almost all of the charging current flows through the path containing the switch 14 and relay contact 28 so that the current, if any, flowing through the relay coil 22 is insufficient to actuate the relay. Since the path containing the switch 14 and relay contact 28 is for all practical purposes a short circuit, this objective may be readily accomplished by merely selecting a relay having a DC coil resistance of several ohms or by placing additional resistance in series with the relay coil 22.

When the circuit is connected to charge the battery 10 through engagement of the plug 20 as illustrated, charging current flows through the battery 10 and through the current path containing the switch 14 and relay contact 28. The switch 14 and relay contact 28 remain in their illustrated normally closed positions and a fast charging current is supplied to the battery 10. The battery is thus fast charged at a desired fast charging rate until the battery reaches an approximately fully charged state.

When the battery reaches this approximately fully charged state, the battery temperature rises sharply and exceeds the predetermined value at which the switch 14 opens. The switch 14 opens, opening the current path containing the switch 14 and relay contact 28 and thus causing all charging current to flow through the relay coil 22. The current then flowing through the relay coil 22 exceeds the predetermined value required to actuate the relay and the relay contact 28 is opened. Current continues to flow through the path containing the relay coil 22 thereby providing a charging current at a low or trickle value through the battery 10 and maintaining the relay contact 28 in its open position.

The battery 10 continues to receive a trickle charge through the current path containing the relay coil 22 and the current path containing the switch 14 and the relay contact 28 remains open irrespective of the position of the switch 14. The switch 14 assumes its normally closed position when the battery temperature drops below the predetermined switching value and the circuit is automatically reset for subsequent charging operations when the connector 20 is disengaged from the tool case and all charging current (i.e., the charging current through the relay coil 22) is interrupted.

To provide an indication of the charge condition of the battery, one or more indicator lamps may be provided as indicated in phantom at 34 and 36 in FIG. 2. The lamp 36 will be energized when the battery charging circuit is supplying a fast charging current to the battery. The lamp 36 will be deenergized and the lamp 34 energized when the trickle charging current is being supplied to the battery.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A battery charging circuit comprising:

first and second terminals for connecting the charging circuit to a source of direct charging current and to one electrode of like polarity of a battery to be charged; and, first and second current paths connected in parallel between said first and second terminals for selectively conducting current from said source of charging current to said one electrode of the battery, said first current path including first and second switching means each having a normally closed position and an open position, said first switching means being actuated from the closed to the open position thereof in response to a temperature of the battery being charged exceeding a predetermined value, said second current path including means for actuating said second switching means from the closed to the open position thereof in response to current flow in said second current path exceeding a predetermined current value, said second current path having a resistance to current flow such that, with said first and second switching means in the normally closed positions thereof, current flow through said second current path is less than said predetermined current value, said predetermined current value being exceeded in response to the opening of either of said switching means.

2. The charging circuit of claim 1 wherein said first switching means comprises an automatically resetting temperature responsive circuit breaking means connected in series with said second switching means and positioned in proximity with the battery being charged to sense the temperature of the battery.

3. The charging circuit of claim 1 wherein said actuating means comprises a relay coil connected in said second current path to receive current flowing in said second current path, said second switching means comprising a normally closed contact actuated by said relay coil.

4. The charging circuit of claim 3 wherein said first switching means comprises a temperature responsive circuit breaking means connected in series with said second switching means and positioned in proximity with the battery being charged to sense the temperature of the battery.

5. The charging circuit of claim 3 wherein the resistance to current flow in said second current path is determined by the direct current resistance of the relay coil, said direct current resistance substantially exceeding the resistance to current flow in said first current path.

6. The charging circuit of claim 2 wherein said circuit breaking means comprises a bimetallic, thermostatic switch.

7. The charging circuit of claim 6 wherein said actuating means comprises a relay coil connected in said second current path to receive current flowing in said second current path, said second switching means comprising a normally closed contact actuated by said relay coil.

8. An automatically resetting system for charging a battery comprising:

a relay coil presenting a predetermined resistance to the flow of direct current therethrough;

first and second terminal means for electrically connecting said relay coil between a source of charging current and one electrode of the battery to be charged; and, circuit means connected between said first and second terminal means in parallel with said relay coil and providing a current path between said terminals, said circuit means including automatically resetting temperature responsive switching means actuated between a normally closed position and an open position in response to the temperature of the battery being charged, said temperature responsive switching means opening the current path between said terminals in response to a sensed temperature of the battery above a predetermined temperature value, said circuit means further including switching means actuated between a normally closed position and an open position in response to current flow above a predetermined current value through said relay coil, said switching means being connected in series with said temperature responsive switching means and said switching means providing, in the normally closed positions thereof, a current path between said terminals having a resistance to the flow of direct current substantially less than the resistance of said relay coil, whereby a fast charging current is supplied to the battery through said current path at sensed temperatures of the battery below said predetermined temperature value and a trickle charging current is supplied to the battery through said relay coil subsequent to a sensed temperature of the battery above said predetermined value.

* * * * *